M. BACKSTROM.
BALL BEARING.
APPLICATION FILED MAR. 12, 1908. RENEWED AUG. 20, 1909.
935,452.  Patented Sept. 28, 1909.
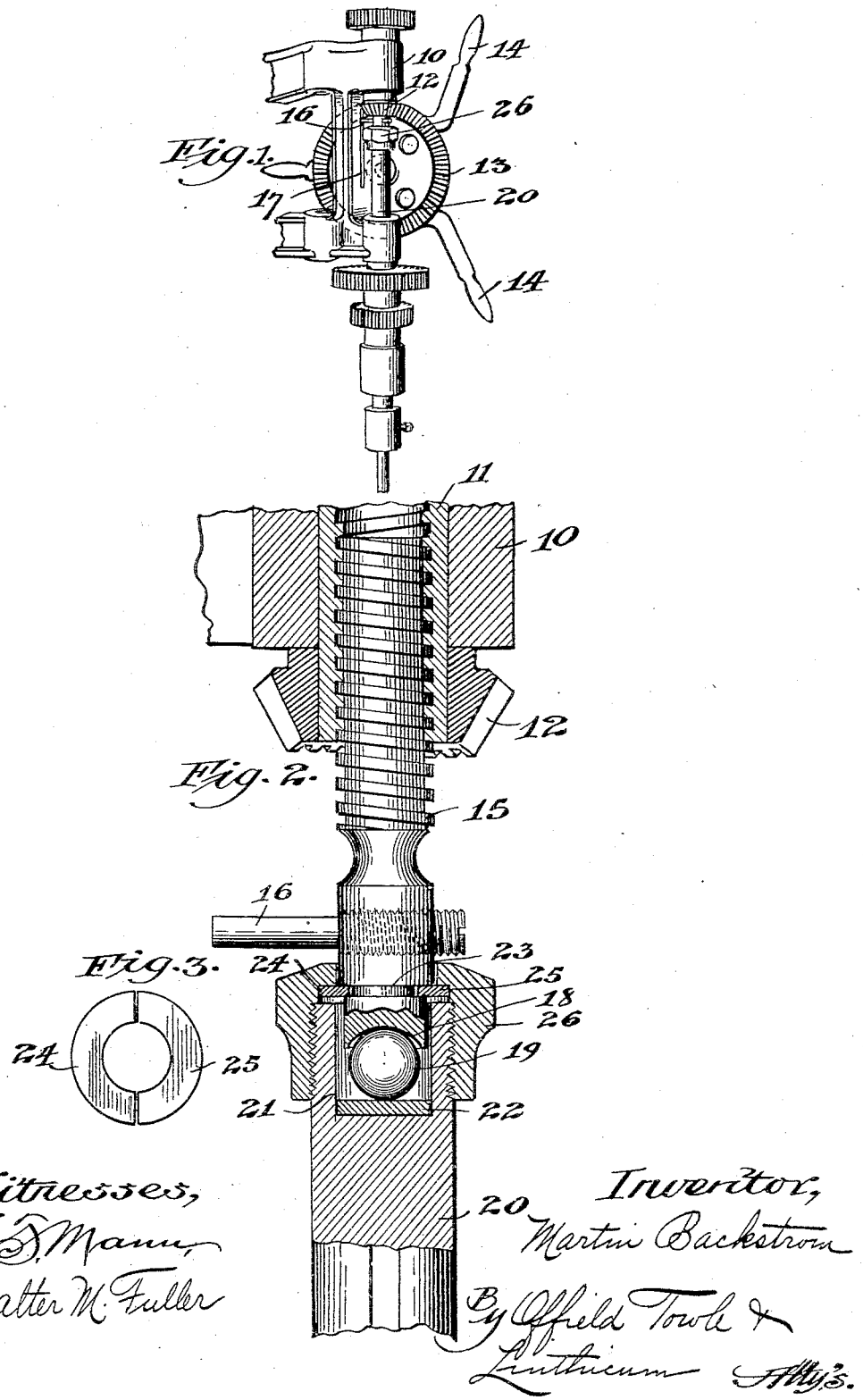
Witnesses,
E. S. Mann
Walter M. Fuller
Inventor,
Martin Backstrom
By Offield Towle & Linthicum Atty's.

UNITED STATES PATENT OFFICE.

MARTIN BACKSTROM, OF CHICAGO HEIGHTS, ILLINOIS, ASSIGNOR TO CANEDY-OTTO MANUFACTURING COMPANY, OF CHICAGO HEIGHTS, ILLINOIS, A CORPORATION OF ILLINOIS.

BALL-BEARING.

935,452.  Specification of Letters Patent.  Patented Sept. 28, 1909.

Application filed March 12, 1908, Serial No. 420,707. Renewed August 20, 1909. Serial No. 513,871.

*To all whom it may concern:*

Be it known that I, MARTIN BACKSTROM, a citizen of the United States, residing at Chicago Heights, in the county of Cook and State of Illinois, have invented certain new and useful Improvements in Ball-Bearings, of which the following is a specification.

My invention concerns ball bearings in general, but pertains more particularly or especially to those for the shaft or spindle of an upright drill, its object and aim being the production of an anti-friction bearing which will be simple in construction, economical of manufacture, and the parts of which will neither be very small nor likely to be lost or misplaced when the bearing is taken apart. This improved and novel bearing has but a single spherical ball fitting in a socket or depression in the bottom end of the screw-threaded shaft or adjustable abutment by which the rotary spindle or shaft proper of the drill is fed up and down, the top end of the spindle having a recess or cavity containing a flat hardened disk on which the ball bears. In a construction of this kind there is theoretically only a single point of contact between the ball and the abutment and spindle, whereby the friction is reduced to a minimum.

On the accompanying drawing, forming a part of this specification, I have illustrated a desirable embodiment of my invention, and on this drawing Figure 1 is a perspective view of a portion of an upright drill having a bearing embodying my improvement; Fig. 2 is a vertical longitudinal central section through the shaft or spindle and the screw-threaded adjustable abutment or feeding shaft of the drill shown in Fig. 1; and Fig. 3 is an illustration of the split washer forming a part of the union connecting the spindle with the abutment.

Rotatable in a bearing in the arm 10 forming a part of the frame of the machine is an internally screw-threaded adjusting nut 11, fixed to the lower end of which is a bevel pinion 12 rotatable by hand by a gear 13 meshing therewith, the gear being equipped with a plurality of operating or actuating handles 14. As is usual, my improved drill is equipped with automatic means for turning this nut 11, but inasmuch as this part of the device involves no portion of my invention, I have omitted illustrating the same. Fitting within the rotary adjusting nut 11 I provide a screw-threaded abutment or shaft 15 which is kept from rotating with the nut by means of a transverse pin 16 passed therethrough and projecting into a vertical slot 17 in the frame of the machine. At its lower end this shaft or abutment 15 is supplied with a curved recess or socket 18, the curvature of which has a greater radius than that of the single anti-friction ball 19 fitting therein. Owing to this construction and arrangement of parts, there is between the ball and the lower end of the shaft or abutment 15 only a single point of contact. This drill has the usual rotary upright shaft or spindle 20 supplied at its upper end with a centrally-disposed cylindrical recess 21 which houses a flat hardened disk 22 bearing on its bottom surface, the ball 19, and a portion of the shaft or abutment 15. As is clearly shown in Fig. 2, the ball 19 rests upon the disk 22 and has a single point of contact therewith.

In order to compel the shaft or spindle 20 to travel upwardly with the abutment or feeding shaft 15, as well as downwardly therewith, the lower end of the abutment shaft is provided with a circular groove 23 in which fits the two parts 24 and 25 of a split washer which projects beyond the outer surface of the shaft 15, as is clearly illustrated. At its upper end the rotary shaft or spindle 20 is externally screw-threaded, and coöperating with these threads is a uniting nut or coupling sleeve 26 which bears against the top surface of the split washer. By adjusting this nut the parts of the bearing may be brought into the proper relation to secure a minimum of friction and the best operative condition. In addition, this nut acts to unite the feeding and adjusting shaft or abutment 15 with the spindle, whereby upon raising the former the elevation of the latter is also brought about. Downward feeding of the spindle, however, occurs directly through the centrally-disposed single ball 19. In order to prevent wear of the parts, the disk 22, ball 19, and the lower end of the abutment or shaft 15 may be hardened.

To those acquainted with devices of this character it will be apparent that my improved bearing can be manufactured at small cost, that it consists of few parts, and that the rotation of the spindle of the drill may be accomplished with but little friction. My invention, however, is not limited and restricted to the precise structural features shown and described, which may be modified to a considerable extent without departure from the heart and essence of the invention or the sacrifice of any of its benefits and advantages.

I claim:

1. In a drill, the combination of an adjustable abutment having a cup-shaped socket, a screw-threaded shaft having a recess in its end, a hard disk in the bottom of said recess, a single ball-bearing in said socket and recess, the ball bearing against said disk, a screw-threaded sleeve or nut engaging the threads of said shaft, and a retaining member on said abutment with which said screw-threaded sleeve or shaft coöperates to prevent separation of the abutment and shaft, substantially as described.

2. In a bearing for the end of a shaft, the combination of an abutment member having a cup-shaped socket, a collar or washer on said abutment member, a screw-threaded shaft having a recess in its end, a single ball bearing against said shaft in said recess and disposed in said socket, and a screw-threaded sleeve or nut fastening said abutment member and shaft together, bearing against said collar, and engaging the threads of said shaft, substantially as described.

3. In a drill, the combination of a screw-threaded adjustable abutment having a cup-shaped socket and a circular groove, a shaft having a recess in its end, a disk in said recess, a single ball in said socket bearing on said disk, a split collar or washer in said circular groove, and a sleeve or nut connecting said abutment to said shaft, coöperating with said collar or washer, and having a screw-threaded connection with said shaft, substantially as described.

MARTIN BACKSTROM.

Witnesses:
B. F. HAWKINS,
CHAS. T. MEYERS.